United States Patent Office 3,328,186
Patented June 27, 1967

3,328,186
COATING COMPOSITION
Kenneth Louton, 1545 Wheeler St.,
Woodstock, Ill. 60098
No Drawing. Filed Dec. 3, 1959, Ser. No. 856,916
8 Claims. (Cl. 106—251)

My invention relates to a coating composition and more specifically to a composition for coating, filling and sealing surfaces.

The composition of my invention is a material of many uses. While it has characteristics and usages in common with paints, mastics and patching materials it differs from these in that it, a single composition, may serve effectively as each of these and provide a combination of characteristics of which no one of these materials is capable. In addition, many fields of application have opend themselves to this material which have been unknown in the past.

The major uses and advantages of my composition are so manifold and varied as to make any comprehensive listing thereof difficult. To illustrate generally the scope of my invention, however, my composition may be used with remarkable success as a filler for rough or porous surfaces such as wood or concrete block, it may be used as a waterproofing material, it is substantially impervious to the most extreme circumstances of weathering, it may be used for building up surfaces, for patching or bridging structural cracks and flaws, for water-proofing mortar joints, and providing new surface characteristics.

The composition of my invention will bond to nearly any surface: concrete, metal, plastics, canvas, as well as wood and wood substitutes. There is virtually no shrink to the material and it may be applied in coatings paint-like in thickness or any thickness greater, almost without limit. My material will skin dry in two hours and can be painted after 24 hours drying. It may be applied with spray equipment, brushes, spatula or caulking guns.

The composition dries to a pliable, leather-like material which has a leather-like flexibility persisting through the life of the coating and under all ordinary temperature extremes. The material is resistant to chemical deterioration or discoloring and to dampness and rot. It will thus be seen that my material is highly versatile and useful, and the enumeration of its properties and use above is illustrative only and by no means exhaustive. Other uses and areas of application will readily suggest themselves as familiarity of the product grows.

An illustrative formulation of a coating composition embodying my invention which I have prepared and used and found entirely satisfactory is, by weight:

Pigment

| | Parts |
|---|---|
| Titanium-calcium pigment (30% $TiO_2$, 70% $CaSO_4$) | 16¼ |
| Titanium dioxide—non-chalking | 2⅛ |
| Titanium dioxide—chalking | 2⅛ |
| $CaCO_3$—dry ground | 4¼ |
| Mica 3x | 4¼ |
| 7M asbestos fibre | 9⅛ |
| Penta chlorophenol | 1¼ |

Vehicle

| | Parts |
|---|---|
| Z-3 linseed (70% solids) (heat bodied) | 29¾₆ |
| Dicyclopentadiene-treated fish oil (previously refined, heat bodied and blown) 50% solids | 29¾₆ |
| Mineral spirits | 1⅞ |
| Xylol | ⅞ |
| Cobalt drier 6% | ¼ |
| Manganese drier 6% | ⅜ |

This composition incorporates about 42% pigment, binders and inert material, and about 58% vehicle. This formulation is, of course, illustrative only, in that other compositions I have tried and found satisfactory differ from this formula both as to proportion and as to components. I have determined that compositions meeting the qualifications of my invention may be prepared from as little as 5% to as much as 50% pigment to the correlative 95 to 50% vehicle. The vehicle, in turn, may incorporate from zero to 35% volatile diluents such as mineral spirits.

The above table is given in terms of parts by weight. In considering simply the pigment-vehicle ratio, the volumetric proportion is possibly more significant than the ratio by weight. Thus, in house paints, the optimum ratio is about 30% pigment by volume. As the pigment proportion diminishes the paint loses adhesiveness and becomes substantially more susceptible to weathering and as the pigment proportion exceeds this ratio, film strength is lost. I have recited the illustrative formulation above in terms of parts by weight because my composition has an exceedingly wide latitude in pigment volume proportion and also because the separate components are better defined in terms of weight proportion. My composition may incorporate as little as 5% or as much as 35% pigment volume. The preparation recited above sets forth a pigment volume of about 20%.

One feature of my composition to which I attribute much of its success is the use of the relatively large proportions of the heavy bodied oils. In the formulation above I have recited the use of Z-3 linseed oil and the dicyclopentadiene-treated fish oil. A combination of oils is not essential to the practice of my invention. I find linseed oil alone to be possibly the most satisfactory vehicle because it is somewhat less subject to weathering and maintains flexibility well, but for economic reasons it may be desirable to substitute other drying oils in whole or in part. I have found that such substitution affects the performance of my material only to a negligible extent.

Other drying oils which I have employed are the fish oil as described in the table above as the sole drying oil component, China wood oil, and soybean oil, individually or in combination. Indeed any drying oil currently in use in the paint industry, properly bodied, performs satisfactorily.

I have likewise found that the method of bodying the oil is irrelevant to the practice of my invention as long as sufficient body is achieved, roughly equal to Z-3 viscosity on the Gardner scale, and that body derives primarily from polymerization rather than oxidation. Thus I have found heated or otherwise polymerized oils to be equally satisfactory, assuming sufficient body is obtained.

I have concluded that a vehicle containing a substantial proportion of large molecules such as polymerized oils possess and such as otherwise bodied oils do not possess to be highly desirable in the practice of my invention. My composition could be prepared with blown oils or otherwise saturated oils which would have the same immediate characteristics as a composition incorporating a polymerized oil, but such a composition would compare unfavorably over a period of time in its deterioration due to weathering and ageing. As indicated before my composition is notable for its maintenance of flexibility under severe weathering conditions and over long periods of time. I have determined the average molecular weight of the oils which I employ to be about 1600 and have found oils ranging from a molecular weight of about 1000 to 2500 to be satisfactory in the practice of my invention. The proportion of pigment to vehicle is largely determined by the particular color and degree of hiding power desired. The formula given above, it will be recalled, consists of 42% pigment etc., of which the color itself amounts to 57% of the pigment. This formulation is directed to a white composition of high hiding power. For somewhat higher hiding power the color could be increased to 28% by volume and the pigment to 50% of the total composition. On the other hand, should a black pigmentation be desired the color could be reduced to 5% by volume of the total composition. It may be that unpigmented composition is preferred. Such a composition is entirely within the purview of my invention and the color be omitted entirely with the fiber constituting the principal solid component. The fiber, in turn, in such a composition may range from 5% to 25% by weight.

I have specified above asbestos as the fibrous component of my invention. Such a component is essential to the practice of my invention but the fiber is not limited to asbestos. Other fibers which I have considered and tried are fibrous talc, glass fibers and vegetable and animal fibers. Of these the glass fiber yields a particularly satisfactory product although at present prices it is uneconomic to employ it. It will be further appreciated that I employ only a surface drier in my composition. A rapid setting and internal cure of my composition works deleteriously to the maintenance of a certain plasticity or resilience of the internal portion of the applied film, and the avoidance of a hardening thereof is generally to be desired in the use of my composition. As my composition is applied in films of more or less thickness to a surface the surface driers insure that subsequent surface treatments such as further paint coats can be applied to my material promptly. On the other hand the internal portion of the film gels quickly to a form-holding consistency but the actual chemical setting thereof is slow.

The mineral spirit or diluent present in my composition adjusts the viscosity of the total composition. In the illustrative formula given above, with the heavy bodied oils and the relatively high proportion of solids, the diluent assures a proper viscosity for both brush and spray application and for a troweled or tooled application. Likewise the evaporation of the diluent insures an increase in viscosity and a thickening of the applied film to a form-holding consistency where, in the pursuit of a desired pigmentation and fiber proportion, the viscosity of the drying oil—solids mixture requires the diluent to cut the viscosity to that required for application.

The pentachlorphenol is present, of course, to prevent rot or fungous deterioration of the composition and protect the surface to which it is applied.

I have stated previously many of the uses to which my invention may be applied. To illustrate further its particular virtues, other uses or more detailed descriptions of the uses above should be added. I have mentioned its use before for building up surfaces. One application to which my composition has been successfully put is in restoring old exterior surfaces such as window sills. Old sills are often eroded away by weathering and the like so as to lose their shape entirely. My material may be troweled on such sills in a thickness necessary to restore the original sill contour, thus to restore the appearance of the sill and prevent further deterioration. It may be applied to new or old wood with or without a previous paint coating and will adhere to either kind of surface without peeling. Because of the heavy bodied oils employed, penetration into unsealed wood (or any unsealed surface) is limited and there is no significant bleeding away of the vehicle from the applied film. Thus no priming is necessary and a finish of uniform and high gloss is obtained.

I have likewise found my product to be admirably suited for application to the mortar between the tiles or bricks of structural surfaces, thereby preventing the erosion of the mortar and consequent necessary tuck pointing.

My composition has been employed as a complete, one coat finish for concrete block buildings, concrete grain bins, etc. It both seals the surface thereof admirably and provides an excellent primer for subsequent paint coats, if desired.

A particular advantage inherent in my composition lies in its use in conjunction with glass or other woven fabric. My composition is not intended as a caulking material to fill relatively large cracks or separations in surfaces. It fills such cracks excellently if they are about ¼" or less in width. For cracks greater in width, however, my composition may be applied to the surface on either side of the crack, a piece of glass fabric laid on my composition to span or bridge the crack and then further composition applied to the glass fabric to provide a dense surface, the glass fabric offering simply a carrying and supporting surface over the crack for my composition. The edges of the crack patch may be feathered off as is conventional in such patching practices.

My composition is particularly successful in the mending of temperature cracks where a crack changes in dimension with the changing seasons. Since my composition remains flexible and adhesive, it draws and compresses as the crack shrinks and swells when used as a filler. When a larger crack is bridged with my composition and glass cloth, the glass cloth, impregnated with my composition, may buckle slightly upon shrinkage of the crack but will not itself crack and upon subsequent expansion the coated glass cloth will subsequently be drawn tight again.

Where a surface to be treated is to be particularly subject to erosion or wear, or where a surface requires particular stability of coating, the same glass cloth technique may be employed. The surface will be coated initially with my composition, glass cloth laid on the composition and a second coat of composition then applied to and forced into the glass fabric. The effect will be a surfacing having all the advantages of a coating of my composition as described above together with the strength and stability which the glass fabric will impart. This same glass cloth technique may be used in building up sills, as described before, the build-up being achieved by the alternate deposit of the cloth and composition until the desired level is reached.

My invention finds particularly wide-spread application in roofing and flashing. Again, in either instance, a coating of my composition is applied to the surface to be covered, a layer of glass cloth embedded in the applied composition and the glass cloth then coated with a second coating of my composition. Such roofing or flashing, while more expensive than an asphalt-prepared surface has many times greater a life, is far more attractive to the eye and avoids wholly the dripping which characterize comparable asphalt coatings. My composition may be used to patch or repair asphaltic roofing materials, copings, gutters, caps, porcelain surfaces, etc., with or without the glass cloth reinforcement depending on the area of failure and the needs of physical strength.

I have stated the fabric in the above instances to be glass cloth. It will be evident that other fabrics may be used. I have employed such materials as muslin and nylon fabrics instead of the glass cloth and found them to function effectively. While the use of muslin in this context might be questioned, it will be recalled that the muslin is thoroughly embedded in my composition and therefore will be protected from weathering, rot and decomposition.

In summary, my composition may be essentially characterized as one containing a fibrous component and a heavy, polymerized, drying oil component, and having a relatively high viscosity. As an example of the texture of my material and its viscous nature, I contemplate that my material when used as an exterior coating will cover from 30 to 120 square feet of surface per gallon as compared to 300 to 600 square feet per gallon of a conventional paint. While I have set forth a single embodiment of my invention in the formulation given above I have determined that satisfactory performance may be found in compositions including as little as 0.2% fiber and as much as 35% fiber and having from 18% to about 80% of the drying oils characterized above. A higher proportion of drying oils would result in a product of unmanageable viscosity and beyond the purview of my invention. However, such drying oils are commercially furnished, as a rule, with a certain percent of thinner therein to provide manageable viscosity for mixing and I am, therefore, able to use 96% of a drying oil as supplied, having from 50% to 80% solids.

I have stated my maximum percentage of drying oil to be 96% and my minimum percentage of fiber to be 0.2%. The balance required to bring these figures to 100% will be provided, of course, by other pigment materials.

A further characteristic of my composition lies in its viscosity which, at its minimum and maximum limits extends from 50 to 800 poises. At a viscosity lower than 50 poises the heavy coating characteristics are lost and at a viscosity higher than 800, my material takes on the consistency of a putty or caulking compound which is not capable of forming the kind of coating I desire.

Within the outer reaches of a range of proportions of a composition of this character, there is an inner range which can be considered a normal range of variation of the central defined formulation rather than just closer limits within the widest definition. In such normal range of variation the solid pigment-vehicle ratio will run, by volume, from 6 to 24 parts pigment to 94 to 76 parts drying oil as characterized above, having on the order of 70% to 80% solids. The pigment proportions will contain from 25% to 100% fiber. The viscosity will be adjusted by addition of thinner as needed to from 125 to 400 poises.

The difficulty in defining precisely an invention of this character lies in the fact that the viscosity of the composition is critical to the practice of the invention but the viscosity is affected by many variables. The different oils I contemplate using have different viscosities and the pigment factors incorporated in the oils will, of course, affect their viscosities. Certainly, the more pigment incorporated, the higher the viscosity will be and the need for thinning greater. On the other hand, different pigment components will affect viscosity differently. A certain proportion of color, for instance, will have a very different effect on the viscosity from that of an equal proportion of inert filler or fiber. Furthermore, nominally identical components from different sources will often have very different effects on viscosity. I have encountered the situation where a fiber derived from one source increased the viscosity of the oil with which it was mixed to a marked extent, requiring the introduction of a substantial portion of thinner whereas the same grade of the same fiber, derived from another source and introduced into the oil in the same proportion, affected the viscosity hardly at all.

From the foregoing description it will be appreciated that my invention is capable of many uses and may be compounded of many materials used alternatively or conjointly through a substantial range of proportion. Although certain of the oils I have mentioned, notably soy bean oil, corn oil and fish oil, are regarded as "semi-drying oils," they are film forming oils upon exposure to air, whether due to oxidation or polymerization, and I therefore, intend by the term "drying oil" in the claims to include these oils.

I therefore desire that my invention be regarded as being limited only as set forth in the following claims.

I claim:
1. A coating composition having, by volume, a pigment-to-drying oil ratio of from 6 to 24 parts pigment, said pigment including from 25% to 100% fiber, to 94 parts to 76 parts of a polymerized drying oil having an average molecular weight of from 1000 to 2400, said composition being free of through dryers and including also essentially only volatile diluent to provide a composition viscosity of from 50 to 800 poises.

2. A coating composition having, by volume, a pigment-to-drying oil ratio of from 6 to 24 parts pigment, said pigment including from 25% to 100% fiber, to 94 parts to 76 parts of a polymerized drying oil having an average molecular weight of from 1000 to 2400, said composition being free of through dryers and including also essentially only volatile diluent to provide a composition viscosity of from 125 to 400 poises.

3. The combination as set forth in claim 2 wherein said drying oil consists of an oil taken from the group consisting of a boiled linseed oil, China wood oil, soybean oil, fish oil, perilla oil, safflower oil, and oiticica oil.

4. The combination as set forth in claim 2 wherein said oil consists of equal parts of heat bodied Z-3 linseed oil at 70% solids and dicyclopentadiene-treated fish oil at 50% solids.

5. The combination as set forth in claim 2 wherein said drying oil has an average molecular weight of about 1600.

6. The composition as set forth in claim 2 wherein said drying oil consists of a mixture of oils taken from the group consisting of bodied linseed oil, China wood oil, soybean oil, fish oil, perilla oil, safflower oil, and oiticica oil.

7. The composition as set forth in claim 1 including additionally a surface drier taken from the group consisting of manganese and cobalt driers.

8. A coating composition having, by volume, a pigment-to-drying oil ratio of from 6 to 24 parts pigment, said pigment including from 25% to 100% fiber, to 94 parts to 76 parts of a polymerized drying oil having a viscosity in excess of Z-2 on the Gardner scale, said composition being free of through dryers and including additionally essentially only volatile diluent to provide a composition viscosity of from 50 to 800 poises.

References Cited

UNITED STATES PATENTS

| | | | |
|---|---|---|---|
| 1,838,658 | 12/1931 | Chapin | 106—251 |
| 2,246,452 | 6/1941 | McGrew | 106—253 |
| 2,983,202 | 5/1961 | Wynn | 106—253 |

FOREIGN PATENTS 742,711  1/1956  Great Britain.

OTHER REFERENCES

Gardner et al.: Paint Testing Manual, 12th edition, 1962 (pages 205–214).

ALEXANDER H. BRODMERKEL, *Primary Examiner.*

JOSEPH REBOLD, MORRIS LIEBMAN, *Examiners.*

J. E. POER, J. B. EVANS, *Assistant Examiners.*